US009149055B2

(12) United States Patent
Berry et al.

(10) Patent No.: US 9,149,055 B2
(45) Date of Patent: Oct. 6, 2015

(54) TOOLLESS COTTON CANDY MACHINE

(71) Applicant: Gold Medal Products Company, Cincinnati, OH (US)

(72) Inventors: Michael James Berry, Burlington, KY (US); Timothy A. Rhome, Milford, OH (US)

(73) Assignee: Gold Medal Products Company, Cincinnati, OH (US)

( * ) Notice: Subject to any disclaimer, the term of this patent is extended or adjusted under 35 U.S.C. 154(b) by 23 days.

(21) Appl. No.: 13/802,892

(22) Filed: Mar. 14, 2013

(65) Prior Publication Data

US 2014/0271958 A1    Sep. 18, 2014

(51) Int. Cl.
B29C 67/02    (2006.01)
A23G 3/10    (2006.01)

(52) U.S. Cl.
CPC ........................................ *A23G 3/10* (2013.01)

(58) Field of Classification Search
CPC .......................................................... A23G 3/10
USPC ................. 425/8, 9; 264/8; 99/348; 366/331, 366/325.1, 325.4, 326.1, 325.2
See application file for complete search history.

(56) References Cited

U.S. PATENT DOCUMENTS

| 1,634,330 | A | * | 7/1927 | Malm | 416/208 |
| 1,786,372 | A | * | 12/1930 | Vogt | 426/513 |
| 2,917,241 | A | * | 12/1959 | Waldrum | 425/8 |
| 3,019,745 | A | | 2/1962 | DuBois et al. | |
| 3,232,244 | A | * | 2/1966 | Wallace et al. | 425/9 |
| 3,248,995 | A | * | 5/1966 | Meyer | 411/337 |
| 4,141,664 | A | * | 2/1979 | Moran et al. | 416/134 A |
| 4,265,591 | A | * | 5/1981 | Gurbin | 416/208 |
| 4,842,502 | A | | 6/1989 | Tsumita et al. | |
| 4,846,643 | A | * | 7/1989 | Yamamoto et al. | 425/7 |
| 5,316,467 | A | * | 5/1994 | Starkey | 425/438 |
| 5,441,754 | A | | 8/1995 | Evans, Sr. | |
| 5,498,144 | A | | 3/1996 | Francis et al. | |
| 5,520,515 | A | * | 5/1996 | Bailey et al. | 416/208 |
| 5,814,357 | A | * | 9/1998 | Boskovic | 425/556 |

(Continued)

FOREIGN PATENT DOCUMENTS

DE    202469 C    3/1907
WO    2007140408 A2    12/2007

OTHER PUBLICATIONS

Jacques Voinot; Invitation to Pay Additional Fees in related PCT patent application No. PCT/US2014/017018; May 23, 2014; 4 pages; European Patent Office.

(Continued)

*Primary Examiner* — Joseph S Del Sole
*Assistant Examiner* — Thukhanh T Nguyen
(74) *Attorney, Agent, or Firm* — Wood, Herron & Evans, LLP

(57) ABSTRACT

A cotton candy machine includes a floss head comprised of a floss head cap, a heated filament spinning screen, a floss head base and a rotatable retaining cap, all removable from said head without tools by manually rotating said retaining cap. A floater includes a vane, a shank and a shank end. Sockets on the upper surface of the retaining cap capture the shanks of plural floaters. The floaters are relative rigid and of selective pitch to produce sugar fiber cooling air flow, and are non-porous for enhanced cleaning. The floss head is easily manually disassembled for cleaning.

31 Claims, 9 Drawing Sheets

(56) References Cited

U.S. PATENT DOCUMENTS 6,250,886 B1 * 6/2001 Immell et al. ............. 416/214 R
7,641,460 B2 * 1/2010 Cretors et al. .................... 425/9

OTHER PUBLICATIONS

International Searching Authority, Search Report and Written Opinion Issued in Corresponding International Application No. PCT/US2014/017018 dated Sep. 30, 2014, 14 pages.

* cited by examiner

TOOLLESS COTTON CANDY MACHINE

FIELD OF THE INVENTION

This invention relates to cotton candy machines and more particularly to the floss heads of such machines and the current variety of safety and sanitary regulations regarding such machines.

BACKGROUND OF THE INVENTION

In known cotton candy machines, a rotating, heated, floss head is oriented above a candy floss receiving bowl from which the candy can be applied to a paper cone, placed in a bag or otherwise collected. Sugar in granular form is dispensed into the rotating heated floss head where it is flung outwardly to a perforated, heated ring or screen, heating the sugar to a melted condition. The molten sugar flows through slots or apertures in the heated, rotating screen and is "spun" outwardly as elongated filaments, where it cools and is collected in the surrounding bowl as cotton candy floss, which can be collected and consumed.

The transition of the melted sugar filaments back to a cooled cotton candy filament state within the bowl is problematical. If the melted sugar engages the bowl before it cools sufficiently, it will stick to the bowl; with the result that cleanup is difficult.

If the sugar filaments are blown about too much, they can be blown over, out or above the bowl, into the area surrounding the bowl and resulting in messy waste.

In an effort to control the sugar filaments, flexible leather "floaters" have been secured to the rotating floss head. These prior leather floaters are disposed or twisted at an angle which is sufficient to suck air into the bowl, drawing air into the bowl primarily from underneath the central area of the mounted bowl near the floss head. This air flow cools the hot filaments before they contact the bowl surfaces, and prevents undesirable air flow or inertia from causing the filaments to flow overboard outside the confines of the bowl.

Such floaters have traditionally been made of flexible leather, pliable enough that they can be mounted to the floss head cap and twisted to a desired angle to create the air flow desired. These leather floaters, used for years, nevertheless present problems of their own. They are porous and are not generally easily treated or cleaned from a sanitizing perspective. Their performance is inconsistent depending on length, pliability, rigidity, angle and the like. Moreover, tools are required to disassemble the head components which hold the floaters so they and the head can be removed for cleaning. This takes effort and operators may not go to the trouble to remove the floaters and the head for proper cleaning.

In another aspect of the invention, various regulations or specifications of food preparation machines, such as cotton candy machines, which are the subject of this invention, are being increasingly and more frequently asserted by federal, state, county and municipal jurisdictions. For example, guidelines from the National Sanitation Foundation (NSF) are more frequently being asserted in such jurisdictions to cover cotton candy machines respecting issues of safety and sanitation. Among these are requirements to render the machines more easily cleanable, capable of being disassembled for cleaning without tools and more protective against electrical shock.

It is thus desired to improve the floater function and structure in a cotton candy machine.

It is also desired to improve access to improved floaters for orientation, as in pitch, and for cleaning.

It is further desired to provide structure to improve floater operation in existing cotton candy machines.

It is further desired to provide cotton candy machine floaters which can easily be removed and thoroughly cleaned, independently of the head.

It is a further objective of the invention to provide an improved floss head for cotton candy machines rendering toolless disassembly safe and improving the candy making function.

Another objective has been to provide a cotton candy machine capable of compliance with increasingly demanding guidelines and regulations.

SUMMARY OF THE INVENTION

To these ends, an improved cotton candy floss or spinner head is provided including floater apparatus for generating an improved air flow for cotton candy machines.

The floaters are made in one piece of any suitable non-porous material and include, in a preferred embodiment, a vane or blade portion, an elongated shank extending therefrom, and an enlarged shank end, facilitating releasable floater mounting and pitch adjustment for the floater.

While the actual rotational and bendable characteristics are somewhat similar to those of the prior leather floaters, the floaters according to the invention are rotated within a holding socket to set their effective angular disposition while the prior leather floaters were simply twisted to set their angle. The new floaters of the invention are also flexible enough to bend, without breaking, should they engage an obstruction while the head to which they are attached is rotated.

The floater of the invention is mounted in a floater mounting socket preferably defined in a retaining cap element releasably and yieldably mounted to the head component of a spinner or floss head. Two or more such floaters are preferably used with each retaining cap.

The floater vane is adjustable, in pitch, within its socket and about the axis of its shank to provide for adjusting the vane angle of attack and the air flow produced thereby, as desired, as the floater is moved through its circular path about the axis of the heated floss head when the apparatus is operable to spin sugar filaments for the production of cotton candy.

When the cotton candy machine is stopped, the retaining cap holding the floaters stops also. The various components can be removed, without tools and the floaters removed from the sockets for cleaning.

Preferably the floaters are made integrally, such that the vane and shank are of an integral, one-piece synthetic material or any suitable plastic or other material not susceptible to normal operating temperatures of the cotton candy machine. In addition, the floaters are non-porous, relative to prior leather used for floaters, so they can be more efficiently cleaned.

A rotatable floss head according to the invention includes the noted retaining cap supporting the floaters, a floss head cap, a floss head base and a heated screen defining a circular band captured between the floss head cap and the floss head base by virtue of the retaining cap yieldably compressing the components together. Fixed bolts extend upwardly from the floss head base through and above the floss head cap. The retaining cap is provided with keyhole slots accommodating rounded heads of the bolts such that the bolts extend through the retaining cap which is twisted with the bolt heads engaging and holding the cap. Springs secured under the cap compress the floss head cap, screen and floss head base operationally together, with retaining ramp features on top of the retaining cap moveably securing it to the rounded bolt heads against undesired release and remote removal.

Sockets on the retaining cap secure the floaters so they extend radially outward of the retaining cap periphery.

On stoppage of the machine, the retaining cap can be manually pressed down and rotated to a position where the bolt heads release it. The cap, floss head and screen can then be removed toollessly for cleaning, along with the floaters. Improved terminals and terminal covers are provided for the electrical terminals for the heated screen.

These and other advantages and objectives will be readily appreciated from the following written description of a preferred embodiment and from the drawings in which:

DETAILED DESCRIPTION OF THE INVENTION

Figure 1:
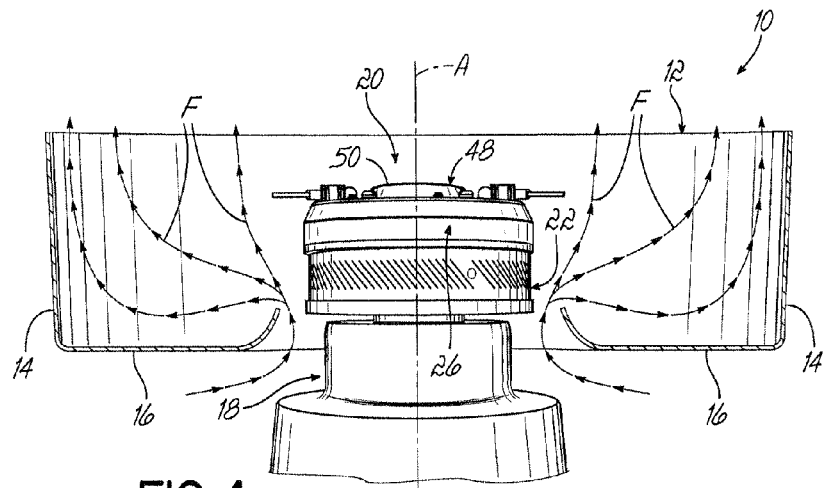
FIG. 1 is an elevational, cutaway view in partial cross-section for clarity and showing one embodiment of a cotton candy machine having a floss head and floaters according to the invention.
Figure 2:
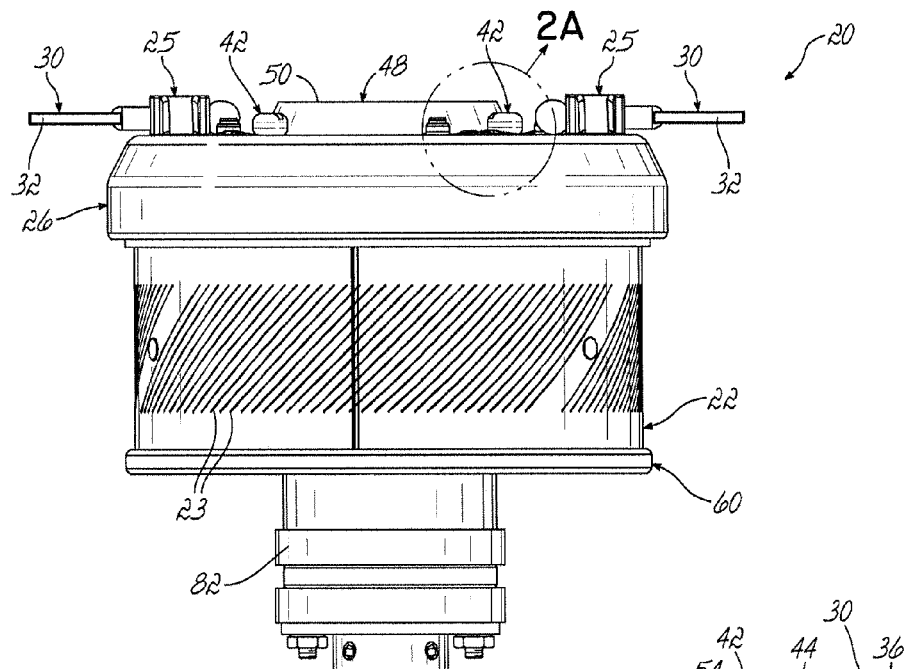
FIG. 2 is an elevational view showing the rotatable floss head of the invention as in FIG. 1.
Figure 2A:
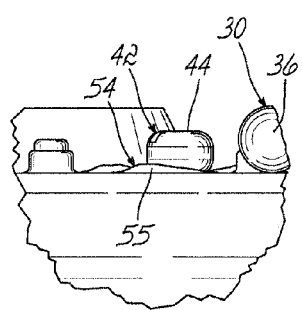
FIG. 2A is an elevational view of the move detail of the encircled area "A" of FIG. 2.

Turning now to the drawings, attention is first directed to FIG. 1 illustrating a cotton candy machine 10 in partial cross-section. Machine 10 has a circular floss gathering bowl 12 with side walls 14 and bottom wall 16. Bowl 12 is mounted on a motorized base 18, and a rotatable floss head 20, rotatable about an axis A. Base 18 extends upwardly above the annular flat bottom wall 16 into the central area of bowl 12. Floss head 20 includes a heated band or screen 22 having a plurality of elongated slots 23 through which heated filaments of sugar (not shown) are dispensed as head 20 is spun within bowl 12.

Rotatable with head 20 is a cone-shaped floss head cap 48.

Figure 7:
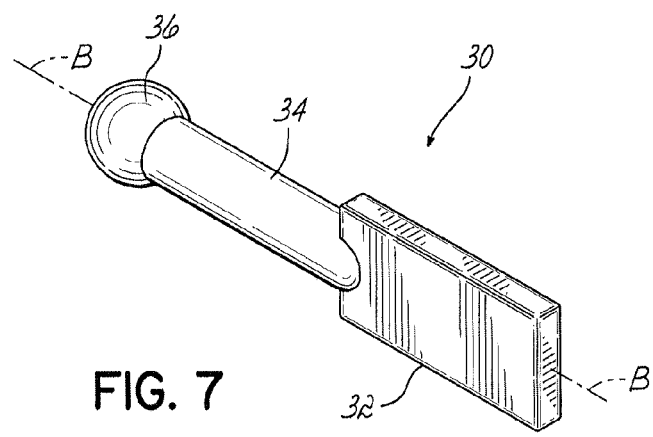
FIG. 7 is an isometric view of the floater vanes of FIGS. 1-6.

A one-piece floater 30 according to a preferred embodiment herein is best seen in FIG. 7. Floater 30 includes a vane 32, an elongated, cylindrical shank 34 extending from vane 32 and an enlarged shank end 36.

Vane 32 can be flat, as shown, or may be of any suitable shape, such as any suitable air foil, profiled or twisted shape such as in an aircraft propeller.

In use, as illustrated in FIG. 1, rotation of head 20 causes floater 30 to pull air inwardly from underneath the center area of bowl 12 into the bowl and upwardly as illustrated by flow arrows F. This cools the molten candy and retains it in the bowl.

Preferably, vane 32, shank 34 and end 36 are formed as one single, integral floater 30 of a suitable synthetic material such as a plastic material capable of operably withstanding the heat from the operation of head 20. One particular material useful in forming such floaters is nitrite butadiene rubber (NBR) of about 70 durometer, formed by molding.

Floater 30 is generally elongated about an axis B extending therethrough, as illustrated in FIG. 7, and is sufficiently rigid, such that vane 32 does not rotate about axis B with respect to shank 34 or enlarged end 36. Further, end portion 36 may be enlarged, as shown, or of any further configuration to operably cooperate with a socket or retention structure 25 on retaining cap 26 and to retain floater 30 in socket 25 against centrifugal force. Preferably, end portion 36 is spherically shaped, having a diameter greater than a diameter of said shank 34. It will be appreciated that shank 34 cooperates with socket 25 such that floater 30 is removably secured in the socket.

Figure 5:
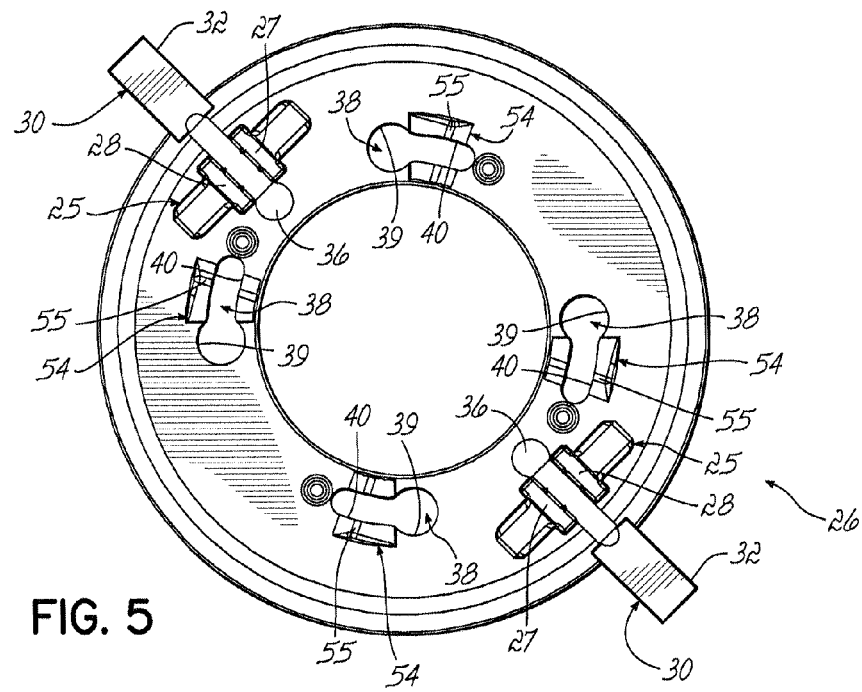
FIG. 5 is a top plan view of the retaining cap of the floss head of FIGS. 1-4.
Figure 5A:
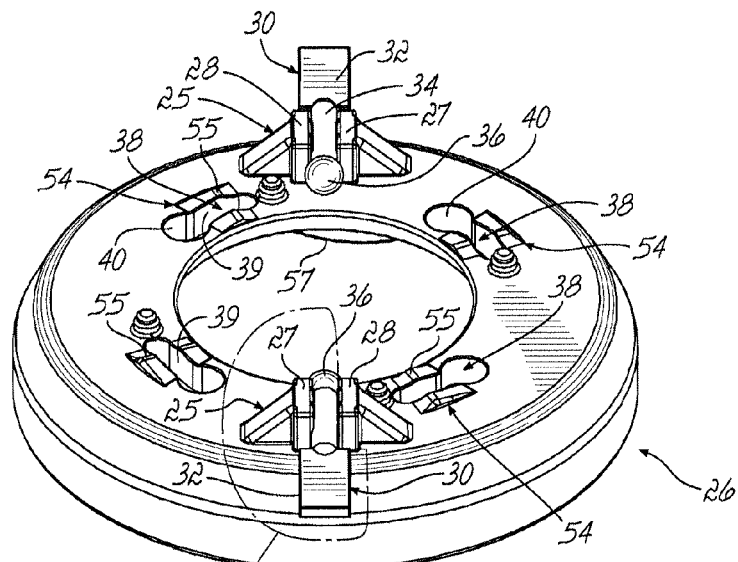
FIG. 5A is an isometric view of the retaining cap of FIG. 5.
Figure 5B:
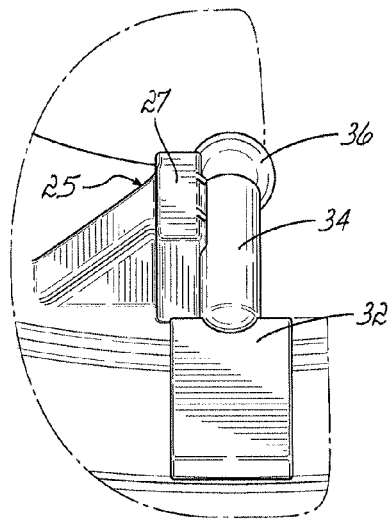
FIG. 5B shows further detail of the socket structure in the encircled area of 5B of FIG. 5A.

Sockets 25 on retaining cap 26 can be integrally formed on or in cap 26. The sockets 25 are of such suitable shape as to frictionally receive end 36 and/or shank 34, and to thus hold floater 30 therein. Floaters 30 can be snapped into sockets 25 in a desired rotational orientation about axis B, or manually rotated angularly about axis B while in sockets 25 as desired. In this regard, note sockets 25 have two opposing sides 27, 28 having protrusions 29 extending inwardly from sides 27, 28 to engage and enhance frictional contact with shanks 34 (FIG. 5B).

Sockets 25 may be any preferably integral part of retaining cap 26, preferably spaced opposite one another at 180 degrees on cap 26. Socket 25 can be any suitable structure to cooperate with shank 34 and end 36 to hold floaters 30 on cap 26. Shanks 34 preferably snap-fit frictionally into socket 25.

As noted above, floaters 30 can be adjusted rotationally about axis B when within sockets 25 in order to set the relative pitch of vanes 32 as desired.

Figure 11:
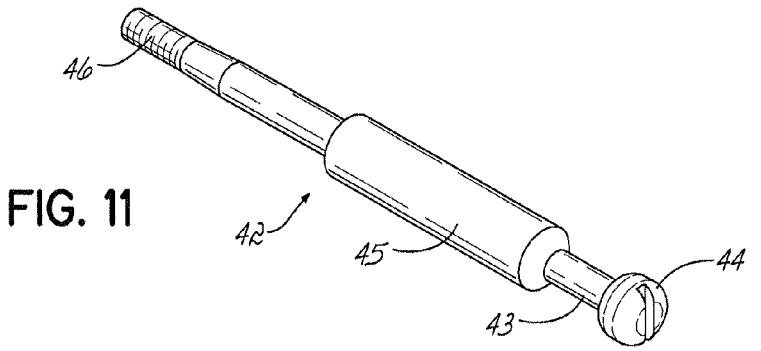
FIG. 11 is an isometric view of one of the retaining, round head bolts of FIGS. 2, 2A, 3 and 4.

Continuing now briefly with description of the components of floss head 20, retaining cap 26 is provided with a plurality of keyhole-shaped apertures 38 having enlarged openings 39 and narrow extensions 40. Bolts 42 (FIG. 11) have reduced diameter portions 43 terminating in enlarged, rounded bolt heads 44. Bolts 42 also have enlarged portions 45 between threaded ends 46 and reduced portions 43 as will be described.

Returning to FIGS. 2-5B, retaining cap 26 has a depending skirt 52, of such extent as to cover at least partially a rim 49 of floss head cap 48, such that there is preferably no visual gap between retaining cap 26 and floss head cap 48.

Further, retaining cap 26 has a plurality of bolt head engaging ramps 54 having peaks 55 thereon above upper surfaces of cap 26.

Figure 3:
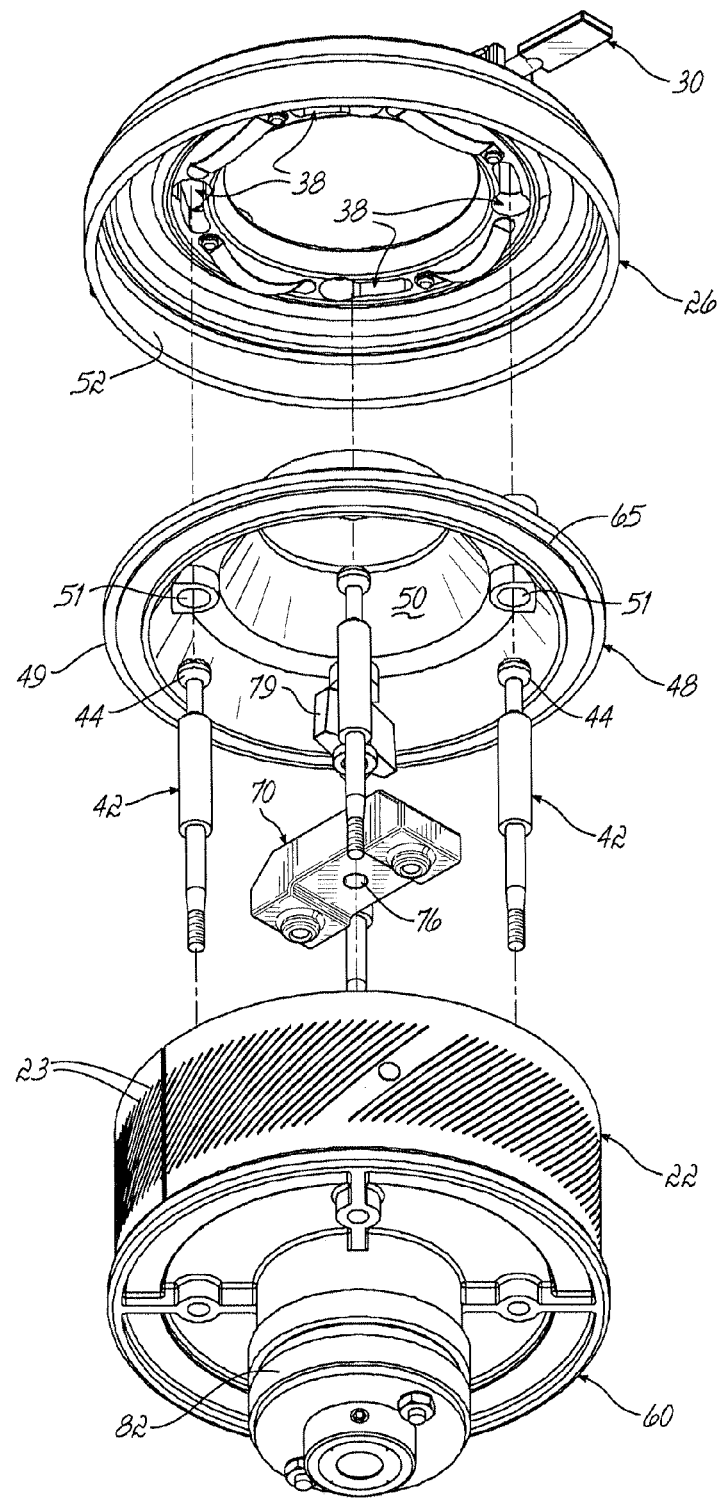
FIG. 3 is an exploded perspective view of the floss head of FIG. 2, from the underside.
Figure 6:
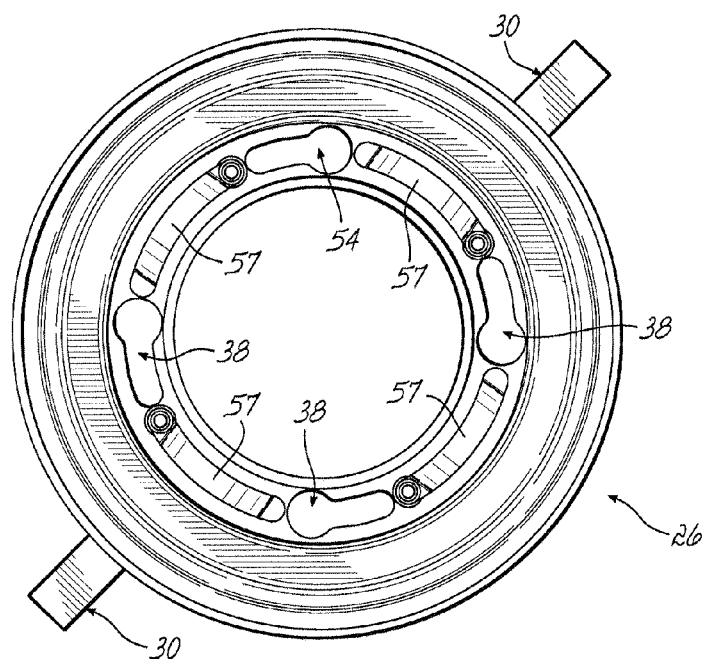
FIG. 6 is a bottom view of the retaining cap of FIG. 5.

Finally, an underneath side of retaining cap 26 is provided with a plurality of springs 57, four being shown in FIGS. 3 and 6. These engage on floss head cap 48 and yieldably provide a diverging bias between retaining cap 26 and floss head cap 48 as will be described. Springs 57 are preferably formed, in an arched configuration (FIG. 6), of 28 gauge stainless steel, and are riveted to retain cap 26 by two piece, press fit tubular rivets of brass with smooth heads such as cutlery-type rivets or any suitable fasteners.

Figure 4:
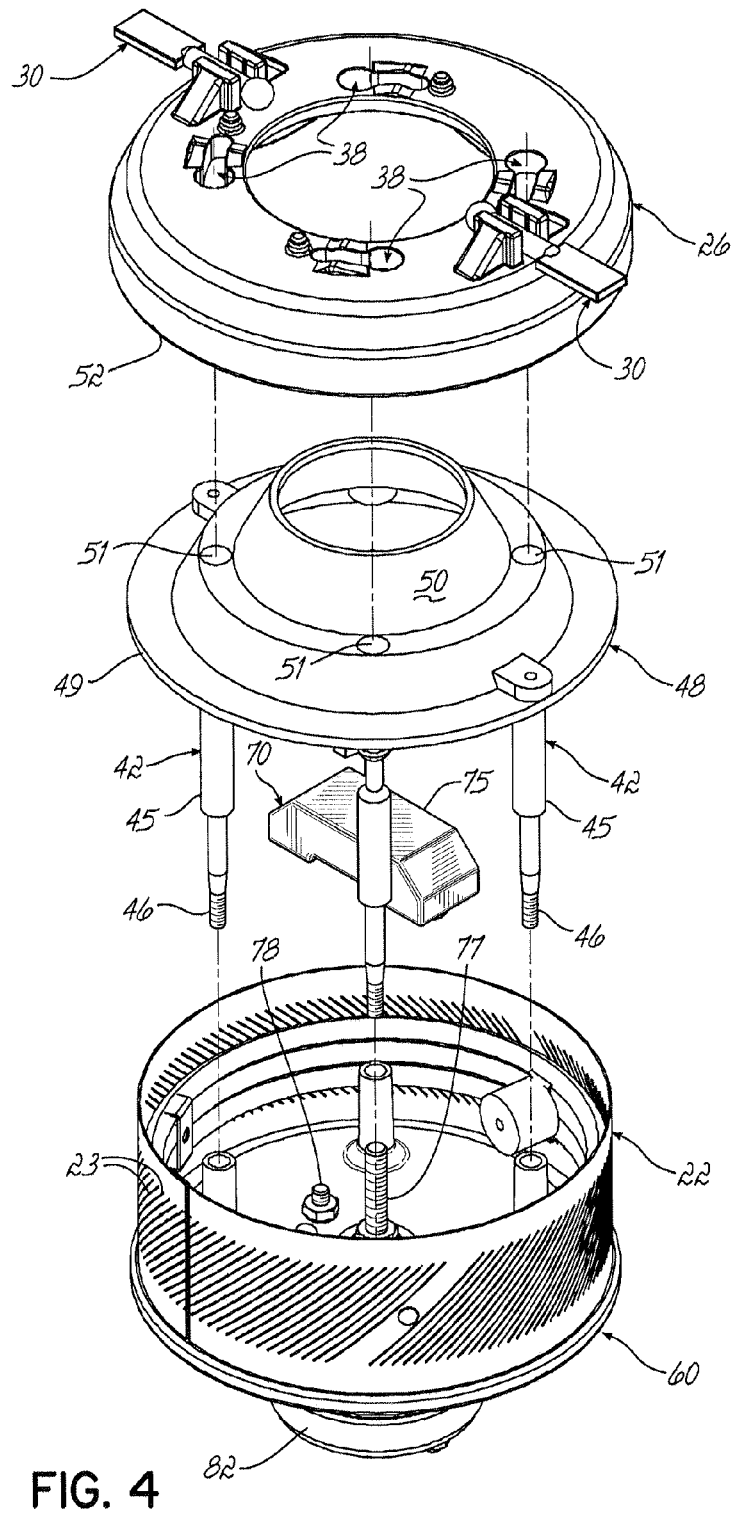
FIG. 4 is an exploded perspective view of the floss head of FIG. 2 from the top side thereof.
Figure 8:
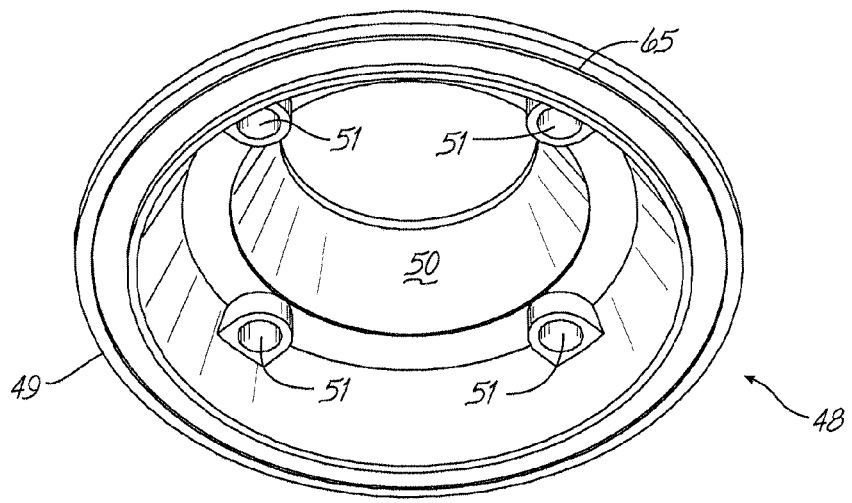
FIG. 8 is a bottom perspective view of the floss head cap of FIGS. 1-4.

Turning now to floss head cap 48 of FIGS. 3, 4 and 8, this cap has an upper funnel-shaped member 50 and a plurality of bores 51. These bores 51 receive the enlarged portions 45 of bolts 42 when floss head cap 48 is assembled over bolts 42 passing therethrough. Funnel-shaped member 50 is open to receive sugar granules poured into floss head 20.

Figure 9:
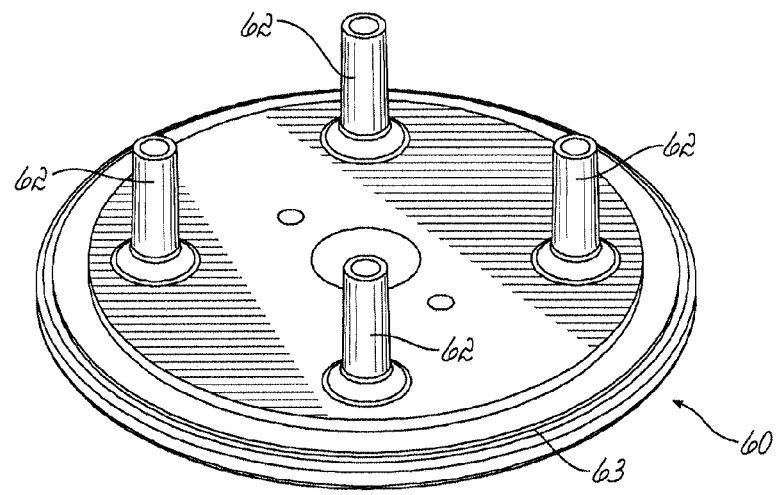
FIG. 9 is a top isometric view of the floss head base of FIGS. 1-4.
Figure 10:
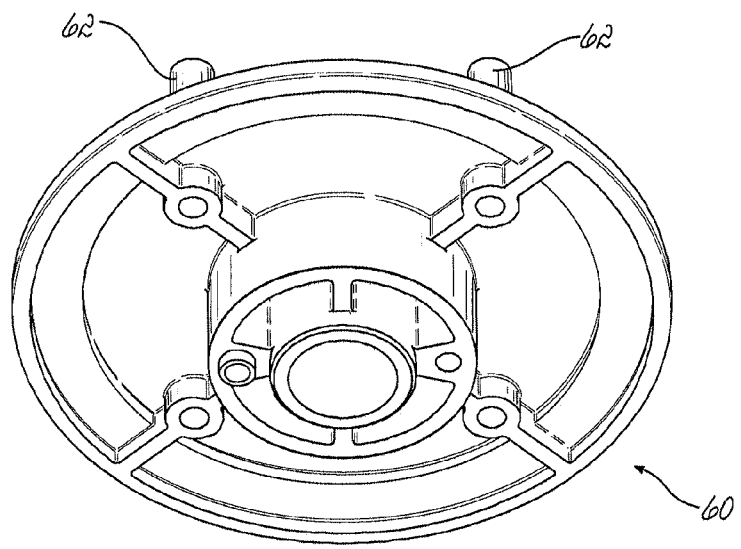
FIG. 10 is a bottom isometric view of the floss head base of FIG. 9.
Figure 12:
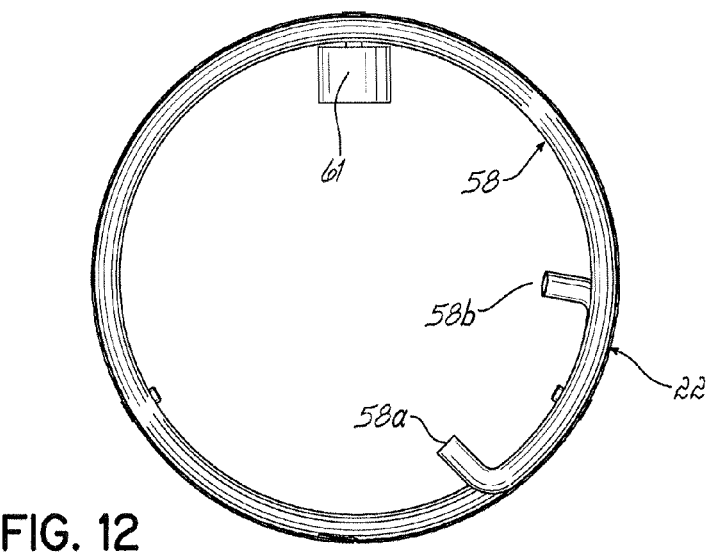
FIG. 12 is a top plan view of the heated screen of FIGS. 1 and 2-4.
Figure 13:
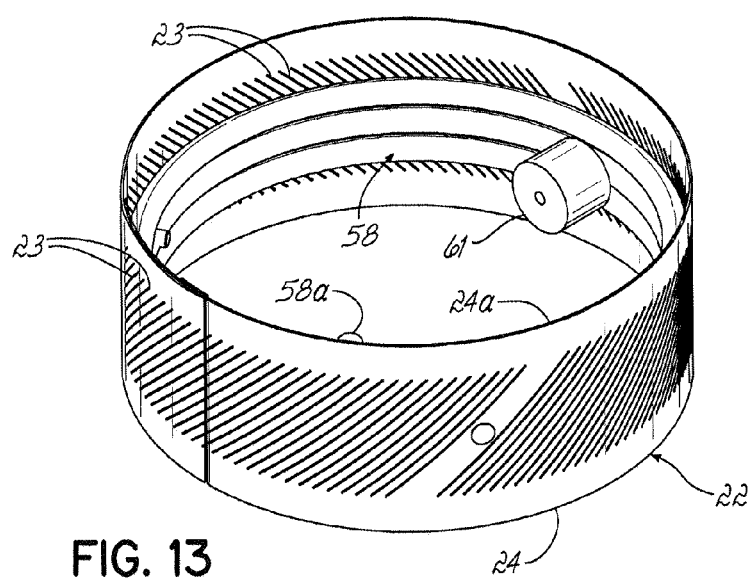
FIG. 13 is a top perspective view of the screen and heating element of FIG. 12.
Figure 14:
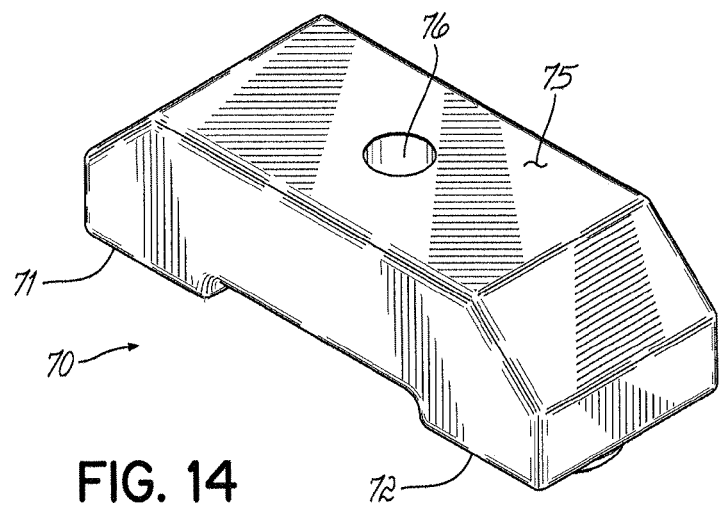
FIG. 14 is an enlarged isometric top view of the terminal cover of FIG. 3.
Figure 15:
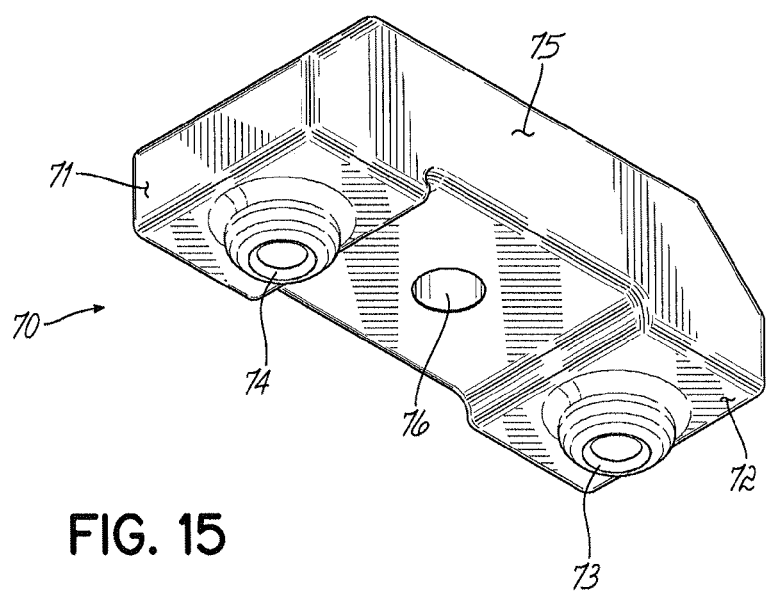
FIG. 15 is an enlarged isometric bottom view of the terminal cover of FIG. 13.

Turning now to FIGS. 12 and 13, screen 22 is provided with angled slots 23 extending therethrough; a tubular heating element 58 wound thereon as shown, with inwardly extending ends 58a, 58b for connection to electric terminals on floss head base 60 (FIGS. 4, 9 and 10). Any suitable heating element may be used, such as, for example only, a ribbon heating element. A counterweight 61 is attached to screen 22 to balance it against vibration as it rotates. Other screen configurations can be used.

As illustrated in FIGS. 9 and 10, floss base head 60 is provided with bosses 62, extending integrally through floss base head 60 (see FIG. 10) to receive threaded ends 46 of bolts 42. Floss base head has a circular step 63 for positioning the lower circular edge 24 of screen 22 when assembled together. Floss head cap 48 has a similar step 65 (FIGS. 3 and 8) for positioning circular upper edge 24a of screen 22 when assembled thereto.

Referring now to FIGS. 3, 4, 14 and 15, floss head 20 further includes a terminal cover or block 70. Block 70 has two depending legs 71, 72, each having a terminal engaging projection 73, 74 and a bridge portion 75 having a bore 76 therethrough. In use, block 70 is pressed down toward floss head base 60 (FIGS. 3, 4) such that screw 77, extending up from that base is received in bore 76. When block 70 is pressed over terminals such as at 78 in FIG. 4, it is held thereon by a thumbnut 79 (FIG. 3). Wires or cables (not shown in FIG. 12) extend from ends of heater 58 to the terminals which are covered by block 70. With this construction, the terminals, such as at 78 (typically two provided) are covered and protected by block 70. However, by unscrewing thumbnut 79, the block 70 can be removed for cleaning it and base 60.

Accordingly, when assembled, floss head base 60 is a part of the rotary floss head 20 assembled to a depending boss 82 outfitted with electrical slip rings for electrically connecting a power source to terminals 78 when head 20 is rotated for heating heater 58 and screen 22 and in a conventional manner. Block 70 is assembled over terminals 78 connected to ends 58a, 58b of heater 58. Screen 22 is placed on floss head base 60, with bolts 42 extending up from base 60. Floss head cap 48 is mounted over screen 22 with bolts 42 extending upwardly through cap 48.

Enlarged portions 45 of bolts 42 extend up through bores 51 in cap 48 with a sliding fit of such tolerance to maintain cap 48 against rotation with respect to floss head base 60. Retaining cap 26 is pressed down onto cap 48, against the bias of springs 57 with heads 44 extending through enlarged portions 39 of apertures 38. Cap 48 is then pressed down to clear bolt heads 44 and turned counterclockwise (as viewed in FIG. 5), such that the undersides of heads 44 ride up ramps 54 and over peaks 55 on cap 48 (FIGS. 5, 5A). The cap 26 is released with bolt heads 44 now captured by the backside of peaks 55 from ramps 54. Bias exerted by springs 57 thus retains the base head 60, cap 48, screen 22 and cap and retaining cap 26 together during rotation of head 20 to spin heated filaments of cotton candy outwardly into bowl 12.

Air flow F (FIG. 1) created by floaters 30 and vanes 32 thereof produces sufficient control of the hot filaments within bowl 12 so they can be easily collected or packaged.

For cleaning, machine 10 is shut down, electrical power is disconnected, and the components are cooled. Retaining cap 26 is then pressed down, rotated clockwise against bias of springs 57 (contacting floss head cap 48), and enlarged apertures 39 aligned with bolt heads 44 so retaining cap 26 can be lifted off head 20.

Floaters 30 can be separated from sockets 25 prior to or after removal of cap 26 for cleaning.

Floss head cap 48 and screen 22 are lifted for cleaning.

Thumbnut 79 is unscrewed and block 70, together with screen 22 heater 58 and electrical cables can be removed for cleaning, providing access to floss head base 60 for its cleaning.

Assembly is performed in reverse order. Cap 26, floss head cap 48, floss head base 60 and block 70 are all made of any suitable heat resistant, electrically insulative material of any suitable material.

These and other modifications and advantages will be readily apparent to those of ordinary skill in the art without departing from the scope of this invention, and applicant intends to be bound only by the claims appended hereto.

What is claimed is:

1. A floater for rotation with a rotatable floss head of a cotton candy apparatus, said floater comprising:
   a vane for moving air in said apparatus upon rotation of said floss head, said vane having an outer surface with a shape for moving air when said vane is rotated by rotation of said floss head to engage and cause air flow;
   an elongated shank extending from said vane;
   said shank having a different shape than that of said vane;
   an end portion on said shank spaced distally from said vane;
   said vane, shank and end portion formed in one integral non-porous piece.

2. A floater as in claim 1 wherein said shank is cylindrical and symmetrical in shape.

3. A floater as in claim 2 wherein said shank end portion is a sphere, said end portion having a diameter greater than a diameter of said shank.

4. A floater as in claim 1 wherein said shank end portion is symmetrical in shape.

5. A floater as in claim 1 wherein said cotton candy apparatus includes a floater socket;
   said shank and said shank end portion having a configuration operatively and frictionally cooperating with said socket for capturing and yieldably holding said shank portion therein, said shank portion being selectively rotatable when operably captured in said socket.

6. A cotton candy apparatus having a floss head and including:
   a floss head cap;
   a floss head retaining cap;
   at least one floater having a symmetrical shank;
   at least one socket on said floss head retaining cap;
   said floater frictionally, yieldably and rotatably captured in said socket,
   said shank being selectively rotatable while captured within said socket.

7. A floater as in claim 6 wherein said end portion comprises an enlarged shank end.

8. Apparatus as in claim 6 wherein said floater includes a vane, said shank and a shank end.

9. Apparatus as in claim 8 wherein said shank end is selectively rotatable with said shank and with respect to said socket to vary the respective operative pitch of said vane within said apparatus.

10. Apparatus as in claim 9 wherein said floss head is rotatable and heatable for melting sugar therein and for spinning molten sugar filaments therefrom, said retaining cap and said floss head cap operably connected in said floss head for rotation therewith.

11. Apparatus as in claim 8 wherein said shank end is spherically-shaped and wherein said floater socket has an interior cavity frictionally receiving said shank.

12. Apparatus as in claim 6 including a plurality of springs on an underside of said retaining cap for engaging said floss head cap, said springs biasing said retaining cap away from said floss head cap.

13. Apparatus as in claim 12 further including a floss head base and a plurality of bolts extending from said floss head base through said floss head cap which is slidable on said bolts.

14. Apparatus as in claim 13 including heads on said bolts and apertures in said retaining cap for receiving said bolt heads, an underside of said bolt heads engaging said retaining cap and securing said retaining cap and said floss head cap within said floss head.

15. Apparatus as in claim 14 including ramp means on said retaining cap for securing said bolt heads in a retaining position on said retaining cap.

16. Apparatus as in claim 15 further including a heated circular perforated screen captured between said floss head cap and a floss head base.

17. Apparatus as in claim 16 wherein said springs urge said retaining cap against said bolt heads and urge said floss head cap against said screen.

18. Apparatus as in claim 17 wherein said retaining cap is rotatable to align said bolt heads with said apertures for releasing said retaining cap.

19. Apparatus as in claim 18 wherein said retaining cap, floss head cap and screen are removeable from said floss head upon rotation of said retaining cap for release from said bolt heads.

20. Apparatus as in claim 19 wherein said floss head cap is slidable on said bolts.

21. Apparatus as in claim 20 wherein said bolts are secured to said floss head base.

22. Apparatus as in claim 13 further including electrical terminals on said floss head base;
a terminal block covering said terminals;
a screw on said floss head base;
a bore in said terminal block receiving said screw; and
a thumbnut on said screw removeably securing said block to said floss head base over said terminals.

23. A cotton candy apparatus having a rotatable floss head comprising:
a floss head cap;
a floss head base;
a perforated heated screen captured between said cap and said base;
a plurality of bolts extending from said base;
said cap slidable along said bolts;
a retaining cap oriented over said floss head cap and being releasably held on said floss head by said bolts and including springs oriented between said retaining cap and said floss head cap, biasing said retaining cap against heads of said bolts and said floss head cap against said screen.

24. Apparatus as in claim 23 wherein said retaining cap has keyhole-shaped slots through which said bolts extend, said retaining cap being rotatable with respect to said floss head cap to capture and to selectively release said floss head cap from said floss head upon rotation of said retaining cap to remove it away from said bolt heads.

25. Apparatus as in claim 24 further including ramp means on an upper surface of said retaining cap to secure said retaining cap under enlarged heads of said bolts upon rotation of said retaining cap with respect to said bolts.

26. In a cotton candy machine, a floss head including a floss head cap, a heated perforated screen and a floss head retaining cap, springs biasing said floss head retaining cap and said floss head cap away from each other, said floss head cap, screen and retaining cap being removeable from said machine by rotation of said retaining cap with respect to said floss head cap without tools.

27. A toolless, rotatable, heated spinner head for a cotton candy apparatus and including in combination:
a rotatable floss receiving head;
a rotatable floss head retaining cap;
a spinner head base;
said head and cap rotatable with said base;
a plurality of bolts extending from said cap through said head and connected to said base,
a plurality of springs oriented between said cap and said head biasing said head toward said base,
said cap slidable along said bolts against bias of said springs,
said bolts having heads engageable with an upper side of said cap and securing said cap over said springs,
said cap being rotatable without application of tool and with respect to said head to disengage from said bolts, relieve bias of said springs on said head and permit said cap and said head to be lifted from said base.

28. A head as in claim 27 wherein said cap includes a variable shaped aperture receiving each bolt, a bolt head engaging a smaller portion of said aperture to hold said cap on said spinner head and said head extendable though a larger portion of said aperture to permit removal of said cap upon rotation thereof with respect to said base.

29. A head as in claim 28 wherein said aperture is in the shape of a key-hole.

30. A head as in claim 28 further including ramp means on said cap adjacent said aperture, said ramp means opposing movement of said cap relative to said head, said cap being moveable toward said floss receiving head to allow said cap to be rotated under said bolt head without engaging said ramp means.

31. A spinner head as in claim 27 further including a plurality of floaters frictionally, and yieldably secured to said spinner head for moving air in said apparatus when said spinner head is rotated, and including sockets for said floaters which are manually rotatable in said sockets for adjusting floater pitch, said floaters including a vane and a symmetrical cylindrical shank rotatable against friction provided by said socket.

* * * * *